United States Patent
Shao et al.

(10) Patent No.: US 10,719,908 B2
(45) Date of Patent: Jul. 21, 2020

(54) METHOD AND APPARATUS FOR STORING IMAGE IN TEXTURE MEMORY

(71) Applicant: Alibaba Group Holding Limited, Grand Cayman (KY)

(72) Inventors: Zhenjiang Shao, Hangzhou (CN); Cun Chen, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 36 days.

(21) Appl. No.: 15/958,989

(22) Filed: Apr. 20, 2018

(65) Prior Publication Data

US 2018/0322609 A1 Nov. 8, 2018

Related U.S. Application Data

(63) Continuation of application No. PCT/CN2016/101983, filed on Oct. 13, 2016.

(30) Foreign Application Priority Data

Oct. 22, 2015 (CN) .......................... 2015 1 0690513

(51) Int. Cl.
*G06T 1/60* (2006.01)
*G06T 7/11* (2017.01)
*G06T 7/13* (2017.01)
*G06T 1/20* (2006.01)

(52) U.S. Cl.
CPC .................. *G06T 1/60* (2013.01); *G06T 1/20* (2013.01); *G06T 7/11* (2017.01); *G06T 7/13* (2017.01); *G06T 2207/20021* (2013.01)

(58) Field of Classification Search
None
See application file for complete search history.

(56) References Cited

U.S. PATENT DOCUMENTS

| | | |
|---|---|---|
| 5,651,136 A | 7/1997 | Denton et al. |
| 6,131,150 A | 10/2000 | DeTreville |
| 2002/0196858 A1* | 12/2002 | Okada ................... H04N 19/40 375/240.25 |

(Continued)

FOREIGN PATENT DOCUMENTS

| | | |
|---|---|---|
| CN | 1798236 A | 7/2006 |
| CN | 101122997 A | 2/2008 |

(Continued)

OTHER PUBLICATIONS

Translation of Search Report from Chinese PCT Application No. PCT/CN2016/101983, dated Jan. 23, 2017, 2 pages.

(Continued)

*Primary Examiner* — Kyle Zhai
(74) *Attorney, Agent, or Firm* — Lee & Hayes, P.C.

(57) ABSTRACT

A method including acquiring dimension information of an image; determining dimensions of texture memory corresponding to the image based on the dimension information of the image; and dividing the image into multiple image blocks based on the dimensions of the texture memory, and storing the multiple image blocks obtained after the division in the texture memory according to a preset storage rule. The methods and apparatuses for storing an image in texture memory save the memory capacity and increase the image processing speed.

20 Claims, 3 Drawing Sheets

(56) References Cited

U.S. PATENT DOCUMENTS

2006/0140498 A1    6/2006   Kudo et al.
2010/0188574 A1*   7/2010   Hung .................. H04N 7/0105
                                                                                               348/500

FOREIGN PATENT DOCUMENTS

| CN | 101127901 A | 2/2008 |
|----|-------------|--------|
| CN | 101097629 A | 4/2009 |
| CN | 102521141 A | 6/2012 |
| CN | 103744736 A | 4/2014 |
| CN | 103778631 A | 5/2014 |

OTHER PUBLICATIONS

Translation of Written Opinion from corresponding Chinese PCT Application No. PCT/CN2016/101983, dated Jan. 23, 2017, 6 pages.

Extended European Search Report dated Mar. 19, 2019 for European Patent Application No. 16856847.5, a counterpart of the U.S. Appl. No. 15/958,989, 11 pages.

Knuth, "Dynamic Storage Allocation", The Art of Computer Programming, vol. 1, Addision-Wesley, Jan. 1, 1997, p. 435-456.

Peterson et al, "Buddy Systems", Communications of the ACM, vol. 20, No. 6, Association for Computing Machinery, Inc. Jun. 1, 1977, United States, pp. 421-431.

Machine translation First Office Action for Chinese patent application No. 201510690513.4. a counterpart foreign application of U.S. Appl. No. 15/958,989, 8 pages.

European Office Action dated Feb. 12, 2020, for European Patent Application No. 16856847.5, a counterpart foreign application of the U.S. Appl. No. 15/958,989, 8 pages.

\* cited by examiner

METHOD AND APPARATUS FOR STORING IMAGE IN TEXTURE MEMORY

CROSS REFERENCE TO RELATED PATENT APPLICATIONS

This application claims priority to and is a continuation of PCT Patent Application No. PCT/CN2016/101983, filed on 13 Oct. 2016, which claims priority to Chinese Patent Application No. 201510690513.4 filed on 22 Oct. 2015 and entitled "Method and apparatus for storing image in texture memory", which are incorporated herein by reference in their entirety.

TECHNICAL FIELD

The present disclosure relates to the field of computer information processing technologies, and, more particularly, to methods and apparatuses for storing an image in texture memory.

BACKGROUND

Image processing has been widely applied as computer technologies develop. Generally, texture memory is firstly applied for an image in the process of processing the image. The image is stored in the texture memory and then processed. If the values of the width and the height of an image texture are powers of 2, a computer graphics card can rapidly process the image.

An existing method for storing an image in texture memory generally includes: applying for texture memory for an image, the width of the texture memory being greater than or equal to the original image width and being a power of 2, the height of the texture memory being greater than or equal to the original image height and being a power of 2, and a minimum value being usually selected from an available range as the value of the power. For example, texture memory for an image having a size of 100 pixels×100 pixels has the size of 128 pixels×128 pixels. The image is stored in the texture memory which is applied for.

The conventional techniques have at least the following problems: In the existing method for storing an image in texture memory, the size of the texture memory is made to be greater than or equal to the height or width of the image and be a power of 2. In some cases, for example, for an image having a size of 65 pixels×65 pixels, the size of the texture memory needs to be 128 pixels×128 pixels in order to meet the requirement that the width and the height of the image texture are the powers of 2. The size of the texture memory is much greater than the actual size of the image. Therefore, the existing method for storing an image in texture memory may waste a large amount of memory capacity, and reduce the image processing speed.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

The example embodiments of the present disclosure provide methods and apparatuses for storing an image in texture memory, to save the memory capacity and increase the image processing speed.

To solve the foregoing technical problems, the method and apparatus for storing an image in texture memory provided by the example embodiments of the present disclosure are implemented as follows:

A method for storing an image in texture memory includes:

acquiring dimension information of an image;

determining dimensions of texture memory corresponding to the image based on the dimension information of the image; and dividing the image into multiple image blocks based on the dimensions of the texture memory, and storing the multiple image blocks obtained after the division in the texture memory according to a preset storage rule.

An apparatus for storing an image in texture memory includes: an image dimension acquisition unit, texture memory dimension determination unit, and an image division and storage unit, wherein:

the image dimension acquisition unit is configured to acquire dimension information of an image, the dimension information including a first dimension in a first direction and a second dimension in a second direction of the image;

the texture memory dimension determination unit is configured to determine dimensions of texture memory corresponding to the image based on the dimension information of the image; and the image division and storage unit is configured to divide the image into multiple image blocks based on the dimensions of the texture memory, and store the multiple image blocks obtained after the division in the texture memory according to a preset storage rule.

As shown from the foregoing technical solution provided by the example embodiments of the present disclosure that, in the method for storing an image in texture memory disclosed in the foregoing example embodiment of the present disclosure, by using image division, the image blocks obtained after the division are stored in the texture memory. Compared with the conventional techniques, the present disclosure may save half of the space of the texture memory, thus increasing the image processing speed.

BRIEF DESCRIPTION OF THE DRAWINGS

To describe the technical solutions in the example embodiments of the present disclosure more clearly, the following briefly introduces the accompanying drawings required for describing the example embodiments. Apparently, the accompanying drawings in the following description merely represent some example embodiments of the present disclosure, and those of ordinary skill in the art may still derive other drawings from these accompanying drawings without creative efforts.

DETAILED DESCRIPTION

The example embodiments of the present disclosure provide a method and an apparatus for storing an image in texture memory.

To enable those skilled in the art better understand the technical solutions of the present disclosure, the technical solutions in the example embodiments of the present disclosure will be clearly and completely described below with reference to the accompanying drawings in the example embodiments of the present disclosure. Apparently, the described example embodiments represent some and not all the example embodiments of the present disclosure. Based on the example embodiments of the present disclosure, other example embodiments acquired by those of ordinary skill in the art without creative effort all belong to the protection scope of the present disclosure.

Figure 1:
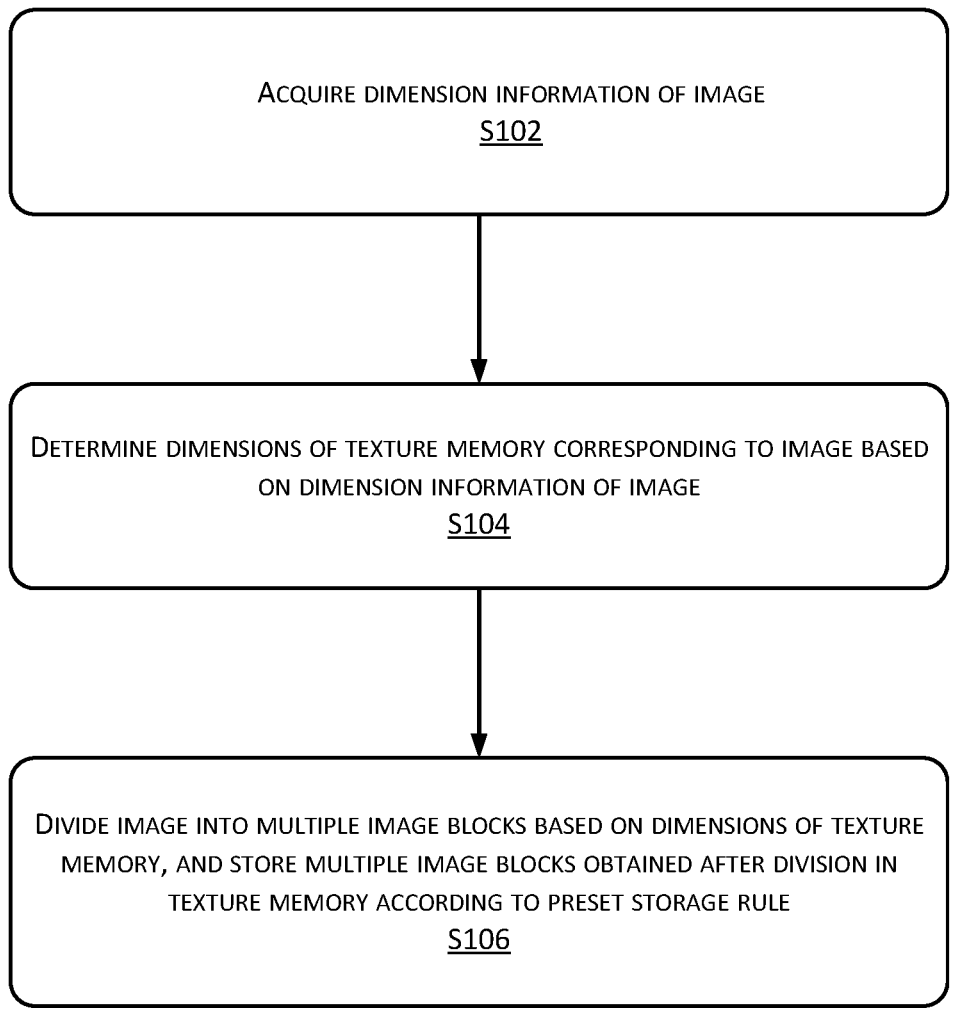
FIG. 1 is a flowchart of a method for storing an image in texture memory according to an example embodiment of the present disclosure.

FIG. 1 is a flowchart of a method for storing an image in texture memory according to an example embodiment of the present disclosure. As shown in FIG. 1, the method for storing an image in texture memory may include:

S102: Dimension information of an image is acquired.

The dimension information of the image may include a first dimension in a first direction and a second dimension in a second direction. The first direction and the second direction may be orthogonal directions. The first direction may be a horizontal direction or a vertical direction. For example, when the first direction is a vertical direction, the first dimension may be the height of the image, the second direction may be a horizontal direction, and the second dimension may be the width of the image.

S104: Dimensions of texture memory corresponding to the image are determined based on the dimension information of the image.

The dimensions of the texture memory corresponding to the image may be determined based on the dimension information of the image. For example, the dimensions of the texture memory may include: a first memory dimension value corresponding to the first dimension of the image and a second memory dimension value corresponding to the second dimension of the image. The first memory dimension value may be ½ of a value that is greater than or equal to the first dimension and that is a power of 2. The second memory dimension value may be a value that is greater than or equal to the second dimension and that is a power of 2.

For example, for an image having a size of 65 pixels×65 pixels, it is supposed that the height, 65 pixels, is the first dimension of the image, and the width, 65 pixels, is the second dimension of the image. Then, the value that is greater than or equal to the first dimension and that is a power of 2 is 128 pixels, and the value that is greater than or equal to the second dimension and that is a power of 2 is 128 pixels. Therefore, the first memory dimension value may be 64 pixels, and the second memory dimension value may be 128 pixels. As such, the dimensions of the texture memory corresponding to the image are 64 pixels×128 pixels.

S106: The image is divided into multiple image blocks based on the dimensions of the texture memory, and the multiple image blocks obtained after the division are stored in the texture memory according to a preset storage rule.

The step of dividing the image into multiple image blocks based on the dimensions of the texture memory may, for example, include: dividing the image in the first direction to obtain at least three image blocks. The at least three image blocks obtained after the division may correspond to three image regions, namely, a first image region, a second image region, and a third image region. The first image region and the third image region may respectively correspond to a first image block and a third image block at two ends of the first direction after the division of the image. The second image region may correspond to one or more image blocks located between the first image region and the second image region after the division of the image.

Dimension values of the first image block and the third image block in the first direction may be ½ of the first memory dimension value. The image block of the second image region may be further divided according to a first division rule to obtain multiple image blocks after the secondary division.

The step of dividing the image block of the second image region according to a first division rule may, for example, include: calculating a minimum number of divisions of the image block of the second image region in the second direction; and dividing the image block of the second image region in the second direction according to the calculated minimum number of divisions.

The step of calculating a minimum number of divisions of the image block of the second image region in the second direction may, for example, include: determining a maximum dimension value of the divided image in the second direction; and calculating the minimum number of divisions of the image block of the second image region in the second direction according to a dimension value of the image block of the second image region in the second direction and the maximum dimension value of the divided image in the second direction. For example, the dimension value of the image block of the second image region in the second direction is M, and the maximum dimension value of the divided image in the second direction is N. Then, the minimum number of divisions in the second direction may be an integer greater than M/N.

In an example embodiment, the maximum dimension value of the divided image in the second direction may be equal to a dimension value of the rest of the texture memory in the second direction.

In an example embodiment, the maximum dimension value of the divided image in the second direction may be equal to a dimension value of the rest of the texture memory in the second direction minus an edge pixel value in the second direction. The edge pixel value in the second direction may be determined according to the number of division edges of the divided image in the second direction. For example, if there are M division edges, the edge pixel value in the second direction may be M. The edge pixel value is reserved for the image blocks stored in the texture memory, so that edge discontinuity does not occur during image processing and magnification.

In an implementation, after the image block of the second image region is divided in the second direction, the method may further include: calculating whether a cumulative dimension value of the image blocks obtained after the secondary division in the second direction is greater than the dimension value of the rest of the texture memory in the second direction; and if yes, further dividing the last image block obtained after the secondary division in the first direction. The further division of the last image block obtained after the secondary division in the first direction may be implemented by using a method same as that used to divide the image block of the second image region, that is, the division may be performed according to the first division rule, where the division direction may be orthogonal to the direction of dividing the image block of the second image region. The division may be performed cyclically in this manner, till the image blocks obtained after the division can all be stored in the texture memory.

The step of storing the multiple image blocks in the texture memory according to a preset storage rule after the division of the image may, for example, include: storing the first image block and the third image block in the first direction along an edge of the texture memory. The step of storing the image blocks in the texture memory according to the preset storage rule after the image block of the second image region is further divided may further include: storing the image blocks obtained after the secondary division of the image block of the second image region in the rest of the texture memory. The image blocks obtained after the secondary division of the image block of the second image region may be stored next to the first image block and the third image block, and may be arranged and stored in the first direction.

The division and storage process may be as follows: performing the storage after the division ends; or performing the division and the storage alternately. For example, after the image blocks of the three image regions are obtained after the division, the image blocks of the first image region and the third image region may be stored first; then, the image block of the second image region is further divided; finally, the image blocks obtained after the secondary division of the image block of the second image region are stored.

In an implementation, the method for storing an image in texture memory may further include: calculating texture coordinates of the multiple image blocks obtained after the division in the texture memory.

For example, the texture coordinates may be calculated according to a distance between the image block and a start vertex of the texture memory. The start vertex may be a vertex at the upper left corner of the texture memory. For example, it is supposed that the size of the texture memory is $2^{n_1} \times 2^{n_2-1}$, a vertex of an image block obtained after division is v, and distances between the vertex v and the start vertex at the upper left corner of the texture memory are separately vx and vy. As such, texture coordinates of the vertex v of this image block may be $(vx/2^{n_1}, vy/2^{n_2-1})$.

The method for storing an image in texture memory according to the present disclosure is introduced below with reference to an actual application scenario.

It is supposed that a rectangular image is obtained, and the width (equivalent to a second direction) and the height (equivalent to a first direction) of the image are respectively picWidth (equivalent to a second dimension) and picHeight (equivalent to a first dimension).

Dimensions of the texture memory corresponding to the image can be determined based on the first dimension and the second dimension. For example, a value that is greater than or equal to the first dimension and that is a power of 2 is $2^{n_2}$, and a value that is greater than or equal to the second dimension and that is a power of 2 is $2^{n_1}$, where $2^{n_1-1} < picWidth \leq 2^{n_1}$, $2^{n_2-1} < picHeight \leq 2^{n_2}$, and $n_1$ and $n_2$ are integers greater than or equal to 0. The height (equivalent to a first memory dimension) of the texture memory is set to $2^{n_2-1}$ that equals a half of the height of the texture memory in the conventional techniques, and the width (equivalent to a second memory dimension) of the texture memory may be set to $2^{n_1}$. In this case, the dimensions of the texture memory are $2^{n_1} \times 2^{n_2-1}$.

The image can be divided into multiple image blocks based on the dimensions of the texture memory. The multiple image blocks are stored in the texture memory according to a preset storage rule.

Figure 2:
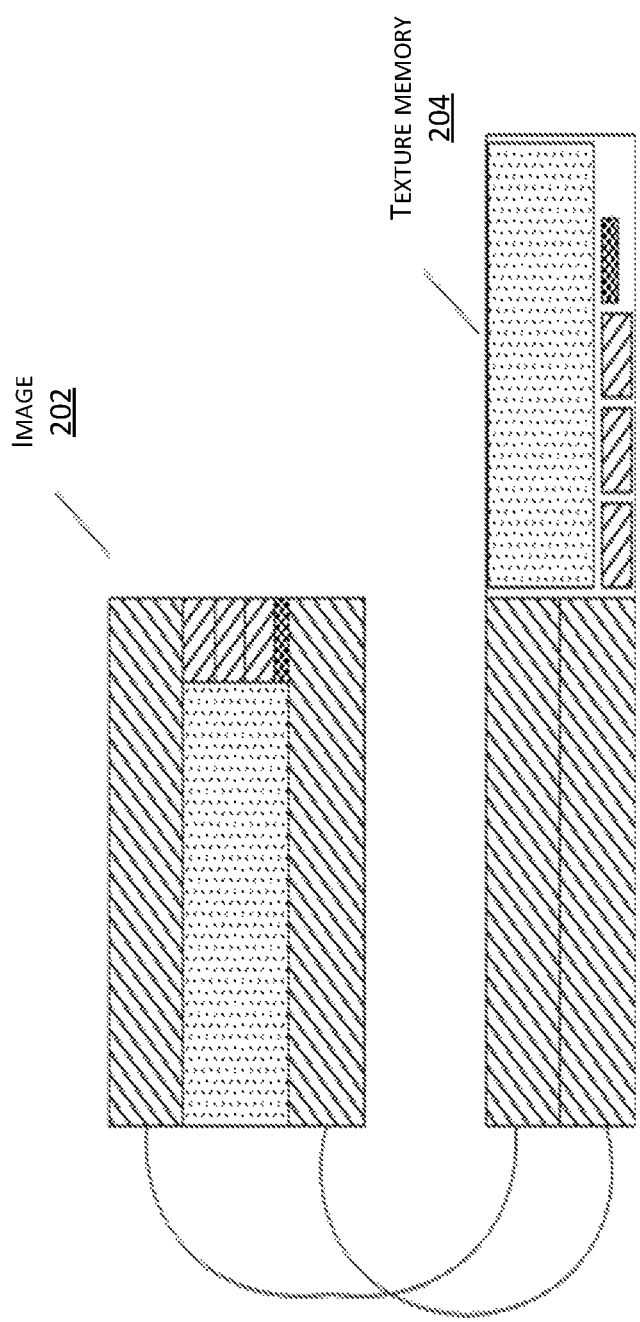
FIG. 2 is a schematic diagram showing image division and storage in a method for storing an image in texture memory according to an example embodiment of the present disclosure.

FIG. 2 is a schematic diagram showing image division and storage in a method for storing an image in texture memory according to an example embodiment of the present disclosure. Parts filled with the same texture may indicate the same image blocks.

As shown in FIG. 2, an image 202 may be divided into upper, middle, and lower image blocks in the height direction.

In order that edge discontinuity does not occur during image magnification, an edge pixel value may be reserved for the image blocks stored in texture memory 204. Then, the heights of the upper image block and the lower image block obtained after the division may be $2^{n_2-2}1$, and the widths may be $2^{n_1}$. The height of the middle image block may be picHeight$-2^{n_2-1}+2$, and the width may be $2^{n_1}$. The upper image block and the lower image block may be sequentially stored in the left region of the texture memory 204.

The middle image block may be further divided vertically. Because the texture memory 204 may store an image block having a width of $2^{n_1}-picWidth-3$, the image blocks obtained after the division of the middle image block may have the width of $2^{n_1}-picWidth-3$. The minimum number of "vertical divisions" is calculated. In this case, the width of the middle image block to be divided may be $2^{n_1}$, and the widths of blocks obtained after the division may be $2^{n_1}-picWidth-3$. As such, it can be calculated that the minimum number of "vertical divisions" is 1, and two image blocks can be obtained after the division. The image blocks obtained after the division may be placed into the rest region of the texture memory 204 in sequence from top to bottom. If a sum of the heights of the two image blocks obtained after the "vertical division" is greater than the height value $2^{n_1-1}$ of the rest dimension of the memory, the last image block obtained after the "vertical division" may be further divided horizontally. Such operations are performed cyclically, till the image blocks obtained after the division can all be stored in the texture memory 204.

Further, texture coordinates of four vertexes of each image block may be calculated.

In the method for storing an image in texture memory disclosed in the foregoing example embodiment, by means of image division, the image blocks obtained after the division can be stored in the texture memory. Compared with the conventional techniques, the present disclosure can save half of the space of the texture memory, thus increasing the image processing speed. Moreover, the image is divided into at least three image blocks, and an image block requiring secondary division does not include vertex angles of the original image. When the vertex angles of the image are not right angles, texture coordinates of the image can be conveniently and rapidly calculated. Further, an edge pixel value is reserved during image division for the image blocks obtained after the division, so that edge discontinuity does not occur during processing and magnification of the divided image.

Figure 3:
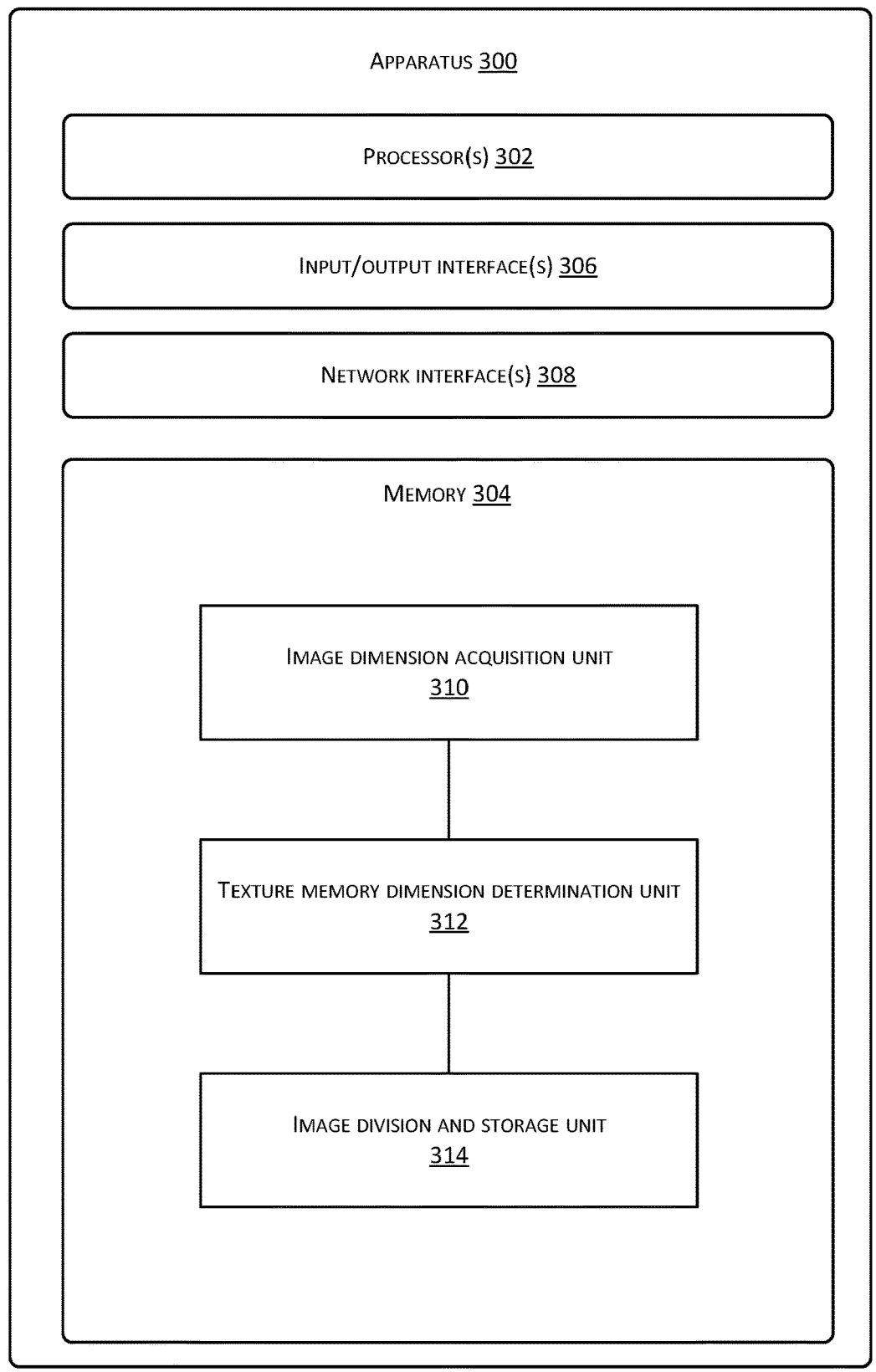
FIG. 3 is a block diagram of an apparatus for storing an image in texture memory according to an example embodiment of the present disclosure.

FIG. 3 is a block diagram of an apparatus for storing an image in texture memory according to an example embodiment of the present disclosure. As shown in FIG. 3, an apparatus 300 for storing an image in texture memory includes one or more processor(s) 302 or data processing unit(s) and memory 304. The apparatus 300 may further include one or more input/output interface(s) 306 and one or more network interface(s) 308. The memory 204 is an example of computer readable media.

The memory 304 may store therein a plurality of modules or units including: an image dimension acquisition unit 310, a texture memory dimension determination unit 312, and an image division and storage unit 314.

The image dimension acquisition unit 310 can be configured to acquire dimension information of an image, the dimension information including a first dimension in a first direction and a second dimension in a second direction of the image.

The texture memory dimension determination unit 312 can be configured to determine dimensions of texture memory corresponding to the image based on the dimension information of the image.

The image division and storage unit 314 can be configured to divide the image into multiple image blocks based on the dimensions of the texture memory, and store the multiple image blocks obtained after the division in the texture memory according to a preset storage rule.

The apparatus for storing an image in texture memory disclosed in the foregoing example embodiment is corresponding to the example embodiment of the method for storing an image in texture memory disclosed in the present disclosure. The apparatus can be used to implement the method example embodiment of the present disclosure and achieve the technical effect of the method example embodiment.

In the 1990s, an improvement in a technology can be obviously distinguished as an improvement in hardware (for example, an improvement in a circuit structure such as a diode, a transistor, or a switch) or an improvement in software (an improvement in a method procedure). However, with the development of technologies, improvements in many method procedures at present can be considered as direct improvements in hardware circuit structures. Almost all designers program the improved method procedures into hardware circuits to obtain corresponding hardware circuit structures. Therefore, it is improper to assume that an improvement in a method procedure cannot be implemented by using a hardware entity module. For example, a Programmable Logic Device (PLD) (such as a Field Programmable Gate Array (FPGA)) is such an integrated circuit whose logic functions are determined by a user by programming a device. Designers perform programming to "integrate" a digital system on a PLD without the need to ask a chip manufacturer to design and manufacture a dedicated integrated circuit chip 2. Moreover, at present, the programming is mostly implemented by using "logic compiler" software, instead of manually manufacturing an integrated circuit chip. The logic compiler software is similar to a software complier used for developing and writing a program, and original code before compiling also needs to be written in a specific programming language, which is referred to as a Hardware Description Language (HDL). There are many types of HDLs such as Advanced Boolean Expression Language (ABEL), Altera Hardware Description Language (AHDL), Confluence, Cornell University Programming Language (CUPL), HDCal, Java Hardware Description Language (JHDL), Lava, Lola, MyHDL, PALASM, and Ruby Hardware Description Language (RHDL), in which Very-High-Speed Integrated Circuit Hardware Description Language (VHDL) and Verilog 2 are most commonly used at present. Those skilled in the art also should know that a hardware circuit for implementing the logic method procedure can be easily obtained by slightly programming the method procedure logically in the above several hardware description languages and programming it into an integrated circuit.

A controller can be implemented in any suitable manner. For example, the controller may be in the form of a microprocessor or a processor and computer readable media storing computer readable program code (for example, software or firmware) executable by the (micro)processor, a logic gate, a switch, an application-specific integrated circuit (ASIC), a programmable logic controller, and an embedded micro-controller. Examples of the controller include, but are not limited to, the following micro-controllers: ARC 625D, Atmel AT91SAM, Microchip PIC18F26K20, and Silicone Labs C8051F320. A memory controller can also be implemented as a part of control logic of a memory.

Those skilled in the art also know that the controller can be implemented by using pure computer readable program code, and in addition, the method steps can be logically programmed to enable the controller to implement the same function in the form of a logic gate, a switch, an ASIC, a programmable logic controller and an embedded microcontroller. Therefore, this type of controller can be considered as a hardware component, and apparatuses included in the controller for implementing various functions can also be considered as structures inside the hardware component. Alternatively, the apparatuses used for implementing various functions can even be considered as both software modules for implementing the method and structures inside the hardware component.

The system, apparatus, module or unit illustrated in the above example embodiments may be, for example, implemented by using a computer chip or an entity, or a product having a particular function.

For ease of description, when the foregoing apparatus is described, it is divided into various units based on functions for respective descriptions. Certainly, when the present disclosure is implemented, functions of the units may be implemented in the same or a plurality of pieces of software and/or hardware.

Based on the foregoing descriptions of the implementations, those skilled in the art can clearly understand that the present disclosure can be implemented by software plus a necessary universal hardware platform. Based on such an understanding, the technical solutions of the present disclosure essentially or the part contributing to the conventional techniques may be implemented in a form of a software product. In a typical configuration, a computing device includes one or more processors (CPU), an input/output interface, a network interface, and a memory. The computer software product may include several instructions for instructing a computer device (which may be a personal computer, a server, a network device, or the like) to perform the methods described in the example embodiments or some parts of the present disclosure. The computer software product may be stored in a memory, and the memory may include a volatile memory, a random-access memory (RAM) and/or a non-volatile memory or the like in computer readable media, for example, a read only memory (ROM) or a flash RAM.

The memory is an example of the computer readable media. The computer readable media include non-volatile and volatile media as well as movable and non-movable media, and can implement information storage by means of any method or technology. Information may be a computer readable instruction, a data structure, and a module of a program or other data. An example of the storage media of a computer includes, but is not limited to, a phase-change memory (PRAM), a static random access memory (SRAM), a dynamic random access memory (DRAM), other types of RAMs, a ROM, an electrically erasable programmable read-only memory (EEPROM), a flash memory or other memory technologies, a compact disc read-only memory (CD- ROM), a digital versatile disc (DVD) or other optical storages, a cassette tape, a magnetic tape/magnetic disk storage or other magnetic storage devices, or any other non-transmission media, and can be used to store information accessible by the computing device. According to the definition in this text, the computer readable media does not include transitory computer readable media (transitory media) such as a modulated data signal and carrier.

The example embodiments in this specification are described progressively, identical or similar parts of the example embodiments may be obtained with reference to each other, and each example embodiment emphasizes a part different from other example embodiments. Especially, the system example embodiment is basically similar to the method example embodiment and is therefore described simply. For related parts, reference may be made to the descriptions of the parts in the method example embodiment.

The present disclosure may be applicable to various universal or dedicated computer system environments or configurations such as a personal computer, a server computer, a handheld device or a portable device, a tablet device, a multi-processor system, a microprocessor-based system, a set top box, a programmable consumer electronic device, a network PC, a microcomputer, a mainframe computer, and a distributed computing environment including any of the above systems or devices.

The present disclosure may be described in a common context of a computer executable instruction executed by a computer, for example, a program module. Generally, the program module includes a routine, a program, an object, an assembly, a data structure, and the like used for executing a specific task or implementing a specific abstract data type. The present disclosure may also be practiced in distributed computing environments. In these distributed computing environments, a task is executed by using remote processing devices connected through a communications network. In the distributed computing environments, the program module may be located in local and remote computer storage media including a storage device.

Although the present disclosure is described through example embodiments, those of ordinary skill in the art should know that the present disclosure has many variations and changes without departing from the spirit of the present disclosure, and it is expected that the appended claims cover the variations and changes without departing from the spirit of the present disclosure.

The present disclosure may further be understood with clauses as follows.

Clause 1. A method for storing an image in texture memory, the method comprising:
acquiring dimension information of an image;
determining dimensions of texture memory corresponding to the image based on the dimension information of the image; and
dividing the image into multiple image blocks based on the dimensions of the texture memory, and storing the multiple image blocks obtained after the dividing in the texture memory according to a preset storage rule.

Clause 2. The method for storing the image in the texture memory of clause 1, wherein the dimension information of the image comprises: a first dimension in a first direction and a second dimension in a second direction, the first direction and the second direction being orthogonal directions.

Clause 3. The method for storing the image in the texture memory of clause 2, wherein the first direction comprises a horizontal direction or a vertical direction.

Clause 4. The method for storing the image in the texture memory of clause 1:
the dimensions of the texture memory comprise a first memory dimension in the first direction and a second memory dimension in the second direction of the texture memory;
the first memory dimension is ½ of a value that is greater than or equal to the first dimension and that is a power of 2; and
the second memory dimension is a value that is greater than or equal to the second dimension and that is a power of 2.

Clause 5. The method for storing the image in the texture memory of clause 4, wherein the dividing the image into the multiple image blocks based on the dimensions of the texture memory comprises:
dividing the image in the first direction to obtain at least three image blocks, the at least three image blocks obtained after the dividing corresponding to three image regions including a first image region, a second image region, and a third image region respectively, the first image region and the third image region corresponding to a first image block and a third image block at two ends of the first direction after the dividing of the image, the second image region corresponding to one or more image blocks located between the first image region and the second image region after the dividing of the image, dimension values of the first image block and the third image block in the first direction being ½ of the first memory dimension of the texture memory; and
dividing the image block of the second image region according to a first division rule to obtain multiple image blocks after the secondary division.

Clause 6. The method for storing the image in the texture memory of clause 5, wherein the storing the multiple image blocks obtained after the dividing in the texture memory according to the preset storage rule comprises storing the first image block and the third image block in the first direction along an edge of the texture memory.

Clause 7. The method for storing the image in the texture memory of clause 5, wherein the dividing the image block of the second image region according to the first division rule comprises:
calculating a minimum number of divisions of the image block of the second image region in the second direction; and
dividing the image block of the second image region in the second direction according to the calculated minimum number of divisions.

Clause 8. The method for storing the image in the texture memory of clause 7, wherein the storing the multiple image blocks obtained after the dividing in the texture memory according to the preset storage rule further comprises:
storing image blocks obtained after the secondary division of the image block of the second image region in the rest of the texture memory, wherein
the image blocks obtained after the secondary division of the image block of the second image region are stored next to the first image block and the third image block, and are arranged and stored along the first direction.

Clause 9. The method for storing the image in the texture memory of clause 7, wherein after the dividing the image block of the second image region in the second direction, the method further comprises:
calculating whether a cumulative dimension value of the image blocks obtained after the secondary division in the second direction is greater than a dimension value of a remaining portion of the texture memory in the second direction; and in response to a positive result, dividing a last image block obtained after the secondary division in the first direction.

Clause 10. The method for storing the image in the texture memory of clause 7, wherein the calculating the minimum number of divisions of the image block of the second image region in the second direction comprises:

determining a maximum value of the divided image in the second direction; and calculating the minimum number of divisions of the block of the second image region in the second direction according to a dimension value of the image block of the second image region in the second direction and the maximum dimension value of the divided image in the second direction, the calculating comprising:

calculating a ratio of the dimension value of the image block of the second image region in the second direction to the maximum dimension value of the divided image in the second direction, the minimum number of divisions being an integer greater than the ratio.

Clause 11. The method for storing the image in the texture memory of clause 10, wherein the maximum dimension value of the divided image in the second direction is equal to a dimension value of a remaining portion of the texture memory in the second direction.

Clause 12. The method for storing the image in the texture memory of clause 10, wherein the maximum dimension value of the divided image in the second direction is equal to a dimension value of the remaining portion of the texture memory in the second direction minus an edge pixel value in the second direction, the edge pixel value in the second direction being equal to a number of division edges of the divided image in the second direction.

Clause 13. The method storing the image in the texture memory of clause 5, further comprising calculating texture coordinates of the multiple image blocks obtained after the dividing in the texture memory.

Clause 14. An apparatus for storing an image in texture memory, the apparatus comprising:

an image dimension acquisition unit;

a texture memory dimension determination unit;

and an image division and storage unit, wherein:

the image dimension acquisition unit is configured to acquire dimension information of an image, the dimension information comprising a first dimension in a first direction and a second dimension in a second direction of the image;

the texture memory dimension determination unit is configured to determine dimensions of texture memory corresponding to the image based on the dimension information of the image; and the image division and storage unit is configured to divide the image into multiple image blocks based on the dimensions of the texture memory, and store the multiple image blocks obtained after a division in the texture memory according to a preset storage rule.

What is claimed is:

1. A method comprising:

acquiring dimension information of an image;

determining dimensions of texture memory corresponding to the image based on the dimension information of the image, the dimensions of the texture memory including a first memory dimension in a first direction and a second memory dimension in a second direction of the texture memory;

dividing the image into at least three image blocks in the first direction, the at least three image blocks corresponding to three image regions including a first image region, a second image region, and a third image region respectively, the first image region and the third image region corresponding to a first image block and a third image block at two ends of the first direction after the dividing of the image, dimension values of the two ends in the first direction being at least equal to each other; and dividing the image block of the second image region according to a first division rule into multiple image blocks, wherein the second image region corresponding to an image block is located between the first image region and the third image region after the dividing of the image and the dimension values of the first image block and the third image block in the first direction is ½ of the first memory dimension of the texture memory.

2. The method of claim 1, wherein the first direction and the second direction are orthogonal directions.

3. The method of claim 2, wherein the first direction comprises a horizontal direction or a vertical direction.

4. The method of claim 1, wherein:

the first memory dimension is ½ of a value that is greater than or equal to the first dimension and that is a power of 2; and the second memory dimension is a value that is greater than or equal to the second dimension and that is a power of 2.

5. The method of claim 4, wherein:

the first memory dimension is ½ of a minimum value that is greater than or equal to the first dimension and that is a power of 2; and the second memory dimension is a minimum value that is greater than or equal to the second dimension and that is a power of 2.

6. The method of claim 1, wherein the dividing the image block of the second image region according to the first division rule comprises:

calculating a minimum number of divisions of the image block of the second image region in the second direction; and dividing the image block of the second image region in the second direction according to the calculated minimum number of divisions.

7. The method of claim 6, further comprising:

storing the multiple image blocks in the texture memory, wherein the multiple image blocks are stored next to the first image block and the third image block, and are arranged and stored along the first direction.

8. The method of claim 6, wherein after the dividing the image block of the second image region in the second direction, the method further comprises:

calculating whether a cumulative dimension value of image blocks obtained after dividing the image block of the second image region in the second direction is greater than a dimension value of a remaining portion of the texture memory in the second direction; and in response to a positive result, dividing a last image block obtained after the dividing the image block of the second image region in the first direction.

9. The method of claim 6, wherein the calculating the minimum number of divisions of the image block of the second image region in the second direction comprises:

determining a maximum value of the divided image of the second image in the second direction; and calculating the minimum number of divisions of the image block of the second image region in the second direction according to a dimension value of the image block of the second image region in the second direction and the maximum dimension value of the divided image of the second image in the second direction.

10. The method of claim 9, wherein the calculating the minimum number of divisions of the image block of the second image region in the second direction comprise:

calculating a ratio of the dimension value of the image block of the second image region in the second direction to the maximum dimension value of the divided image in the second direction, the minimum number of divisions being an integer greater than the ratio.

11. The method of claim 9, wherein the maximum dimension value of the divided image in the second direction is equal to a dimension value of a remaining portion of the texture memory in the second direction.

12. The method of claim 9, wherein the maximum dimension value of the divided image in the second direction is equal to a dimension value of the remaining portion of the texture memory in the second direction minus an edge pixel value in the second direction, the edge pixel value in the second direction being equal to a number of division edges of the divided image in the second direction.

13. The method of claim 1, further comprising calculating texture coordinates of the multiple image blocks obtained after the dividing in the texture memory.

14. The method of claim 1, further comprising storing the at least three image blocks obtained after the dividing in the texture memory according to a preset storage rule.

15. The method of claim 14, wherein the storing the at least three image blocks obtained after the dividing in the texture memory according to the preset storage rule comprises storing the first image block and the third image block in the first direction along an edge of the texture memory.

16. An apparatus comprising:
one or more processors; and
one or more memories storing thereon computer-readable instructions that, when executed by the one or more processors, cause the one or more processors to perform acts comprising:
acquiring dimension information of an image, the dimension information comprising a first dimension in a first direction and a second dimension in a second direction of the image;
determining dimensions of texture memory corresponding to the image based on the dimension information of the image;
dividing the image into at least three image blocks in the first direction, the at least three image blocks corresponding to three image regions including a first image region, a second image region, and a third image region respectively, the first image region and the third image region corresponding to a first image block and a third image block at two ends of the first direction after the dividing of the image, dimension values of the two ends in the first direction being at least equal to each other; and
dividing the image block of the second image region according to a first division rule into multiple image blocks,
wherein the second image region corresponding to an image block is located between the first image region and the third image region after the dividing of the image and the dimension values of the first image block and the third image block in the first direction is ½ of the first memory dimension of the texture memory.

17. The apparatus of claim 16, wherein the acts further comprise storing the at least three image blocks obtained after the division in the texture memory according to a preset storage rule.

18. The apparatus of claim 17, wherein:
the dimensions of the texture memory comprise a first memory dimension in the first direction and a second memory dimension in the second direction of the texture memory;
the first memory dimension is ½ of a value that is greater than or equal to the first dimension and that is a power of 2; and
the second memory dimension is a value that is greater than or equal to the second dimension and that is a power of 2.

19. One or more memories storing thereon computer-readable instructions that, when executed by one or more processors, cause the one or more processors to perform acts comprising:
acquiring dimension information of an image;
determining dimensions of texture memory corresponding to the image based on the dimension information of the image, the dimensions of the texture memory including a first memory dimension in a first direction and a second memory dimension in a second direction of the texture memory;
dividing the image into at least three image blocks in the first direction, the at least three image blocks corresponding to three image regions including a first image region, a second image region, and a third image region respectively, the first image region and the third image region corresponding to a first image block and a third image block at two ends of the first direction after the dividing of the image, dimension values of the two ends in the first direction being at least equal to each other;
dividing the image block of the second image region according to a first division rule into multiple image blocks; and
storing the at least three image blocks obtained after the dividing in the texture memory according to a preset storage rule,
wherein the second image region corresponding to an image block is located between the first image region and the third image region after the dividing of the image and the dimension values of the first image block and the third image block in the first direction is ½ of the first memory dimension of the texture memory.

20. The one or more memories of claim 19, wherein
the dimensions of the texture memory comprise a first memory dimension in the first direction and a second memory dimension in the second direction of the texture memory;
the first memory dimension is ½ of a value that is greater than or equal to the first dimension and that is a power of 2; and
the second memory dimension is a value that is greater than or equal to the second dimension and that is a power of 2.

* * * * *